(12) United States Patent
Pang

(10) Patent No.: US 8,240,988 B2
(45) Date of Patent: Aug. 14, 2012

(54) FASTENER ASSEMBLY WITH CYCLONE COOLING

(75) Inventor: Michael K. Pang, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1404 days.

(21) Appl. No.: 12/055,507

(22) Filed: Mar. 26, 2008

(65) Prior Publication Data

US 2010/0003071 A1    Jan. 7, 2010

(51) Int. Cl.
*F16B 35/00* (2006.01)
*F01D 25/26* (2006.01)
(52) U.S. Cl. .................... 415/180; 415/214.1; 411/395
(58) Field of Classification Search .............. 415/108, 415/180; 411/395, 396, 397
See application file for complete search history.

(56) References Cited

U.S. PATENT DOCUMENTS

| | | |
|---|---|---|
| 2,320,398 A | 6/1943 | Zetterquist |
| 4,069,102 A | 1/1978 | Berringer et al. |
| 4,749,298 A | 6/1988 | Bundt et al. |
| 4,820,097 A | 4/1989 | Maeda et al. |
| 5,072,785 A | 12/1991 | Dressler et al. |
| 5,129,447 A | 7/1992 | Hamner |
| 6,047,552 A | 4/2000 | Gross et al. |
| 6,055,288 A | 4/2000 | Schwirian |
| 6,105,363 A | 8/2000 | Hultgren et al. |
| 6,428,272 B1 | 8/2002 | Pepi et al. |
| 6,532,929 B2 | 3/2003 | Antonevich et al. |
| 7,037,065 B2 | 5/2006 | Reigl |
| 7,117,983 B2 | 10/2006 | Good et al. |

FOREIGN PATENT DOCUMENTS

SU        1712425 A1 *  2/1992

* cited by examiner

*Primary Examiner* — Richard Edgar

(57) ABSTRACT

A fluid cooled fastener assembly for use in a high temperature environment and a method of fluid cooling a fastener assembly are provided. The fastener has a coolant passage extending axially through the fastener and a coolant collector coupled to an end of the fastener. The coolant collector includes a collector opening configured to capture a portion of a cooling fluid flowing past the coolant collector and a contoured passage in communication with the collector opening and the passage in the fastener. The contoured passage is configured to accelerate the cooling fluid captured by the coolant collector and to direct it into the coolant passage in the fastener.

20 Claims, 4 Drawing Sheets

FASTENER ASSEMBLY WITH CYCLONE COOLING

FIELD OF THE INVENTION

The present invention relates to a fluid cooled fastener assembly and a method of fluid cooling a fastener assembly, and more particularly, a fastener assembly having a collector for collecting a cooling fluid and directing the cooling fluid into an internal passage within the fastener.

BACKGROUND OF THE INVENTION

Fasteners, such as nut and bolt assemblies, are used in a wide variety of applications. The use of such assemblies has achieved wide acceptance due to their high reliability and relatively low cost as compared to other fastening means. However, some applications, such as joints in steam or gas turbines may expose the fastener assemblies to temperatures that exceed the fastener material's maximum allowable temperature, resulting in a reduced service life or failure of the fastener.

As the demand for higher efficiency turbines increases, the turbines are operated at higher temperatures exposing fasteners used within the turbines to higher temperatures. Continued exposure to these high temperatures may cause the fasteners to weaken and loose pre-stress. As the fasteners enter the creep range, the material properties begin to decrease exponentially leading to failure of the fastener. Rather than using fasteners made of more expensive materials, it is desirable to cool the fasteners in order to maintain the temperature of the fastener within the maximum allowable temperature of the material from which the fastener is made.

It is known to cool fasteners by passing a cooling fluid such as air or steam around a periphery of the fastener or through a cooling passage within the fastener. The effectiveness of such methods is limited by the heat transfer rate between the fastener and the cooling fluid. Hence, it is desirable to provide a cooled fastener assembly that facilitates or improves heat transfer from the fastener assembly to enable use of the fastener assembly in higher temperature applications.

SUMMARY OF THE INVENTION

In accordance with a first aspect of the present invention, a fluid cooled fastener assembly for use in a high temperature is provided. The fastener assembly may comprise a fastener having a coolant passage extending axially through the fastener from a collector end to a discharge end and a coolant collector coupled to the collector end of the fastener. The coolant collector may comprise an exterior surface having a collector inlet therein. The collector inlet may be configured to capture a portion of a cooling fluid flowing past the collector inlet. The coolant collector may further comprise a contoured passage in communication with the collector inlet. The contoured passage may be configured to accelerate the cooling fluid flowing into the collector inlet such that a heat transfer rate between the cooling fluid and at least one of the coolant collector and the fastener is increased. The contoured passage may be further configured to direct the cooling fluid into the coolant passage in the fastener. As the cooling fluid flows through the coolant passage in the fastener from the collector end to the discharge end it removes heat from at least one of the coolant collector and the fastener.

The coolant collector may further comprise a nozzle chamber disposed between the contoured passage and the coolant passage in the fastener. The nozzle chamber may be configured to receive the cooling fluid from the contoured passage and to accelerate the cooling fluid flowing through the nozzle chamber such that the heat transfer rate between the cooling fluid and at least one of the coolant collector and the fastener is further increased.

In accordance with a second aspect of the present invention, a turbine joint including an inner casing and an outer casing defining a steam passage therebetween is provided. The turbine joint may comprise an inner casing upper flange, an inner casing lower flange and a fluid cooled fastener assembly for joining the inner casing upper flange to the inner casing lower flange. The fluid cooled fastener assembly may comprise a fastener having a coolant passage extending axially through the fastener from a collector end to a discharge end and a coolant collector coupled to the collector end of the fastener. The coolant collector may comprise an exterior surface having a collector inlet therein. The collector inlet may be configured to capture a portion of a cooling fluid flowing past the collector inlet. The coolant collector may further comprise a contoured passage in communication with the collector inlet. The contoured passage may be configured to accelerate the cooling fluid flowing into the collector inlet such that a heat transfer rate between the cooling fluid and at least one of the coolant collector and the fastener is increased. The contoured passage may be further configured to direct the cooling fluid into the coolant passage in the fastener. As the cooling fluid flows through the coolant passage in the fastener from the collector end to the discharge end it removes heat from at least one of the coolant collector and the fastener.

In accordance with a third aspect of the present invention, a method of cooling a fastener assembly for use in a high temperature environment is provided. The method may comprise providing a fastener assembly having a coolant passage extending axially through the fastener from a collector end to a discharge end and providing a coolant collector coupled to the collector end of the fastener. Providing a coolant collector may comprise providing a collector inlet in an exterior surface of the coolant collector for collecting a cooling fluid from a cooling fluid flow and providing a contoured passage in communication with the collector inlet for receiving the cooling fluid from the collector inlet. The method may further comprise capturing a portion of a cooling fluid flowing past the coolant collector in the collector inlet and accelerating the cooling fluid in the contoured passage such that a heat transfer rate between the cooling fluid and at least one of the coolant collector and the fastener is increased. The method may yet further comprise directing the cooling fluid into the coolant passage in the fastener, passing the cooling fluid through the coolant passage from the collector end to the discharge end, transferring heat from at least one of the coolant collector and the fastener to the cooling fluid and discharging the cooling fluid from the discharge end of the coolant passage.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof and in which is shown by way of illustration, and not by way of limitation, specific preferred embodiments in which the invention may be practiced. It is to be understood that other embodiments may be utilized and that changes may be made without departing from the spirit and scope of the present invention.

The present invention concerns a fluid cooled fastener assembly for use in a high temperature application such as a steam or gas turbine. The fastener assembly may comprise a threaded fastener, for example, a bolt or stud and a threaded nut. A coolant collector, which may be integral with a bolt head or the nut collects a portion of a cooling fluid flowing past the coolant collector and directs it into a contoured passage within the coolant collector. The cooling fluid is accelerated within the contoured passage such that a heat transfer rate between the cooling fluid and the coolant collector and a heat transfer rate between the cooling fluid and the fastener is increased. The cooling fluid is directed into a coolant passage provided within the fastener and passes through the coolant passage from a collector end to a discharge end of the fastener where it is subsequently discharged. As the cooling fluid passes through the coolant collector and the fastener, heat is removed from the coolant collector and the fastener thereby cooling the fastener assembly.

Figure 1:
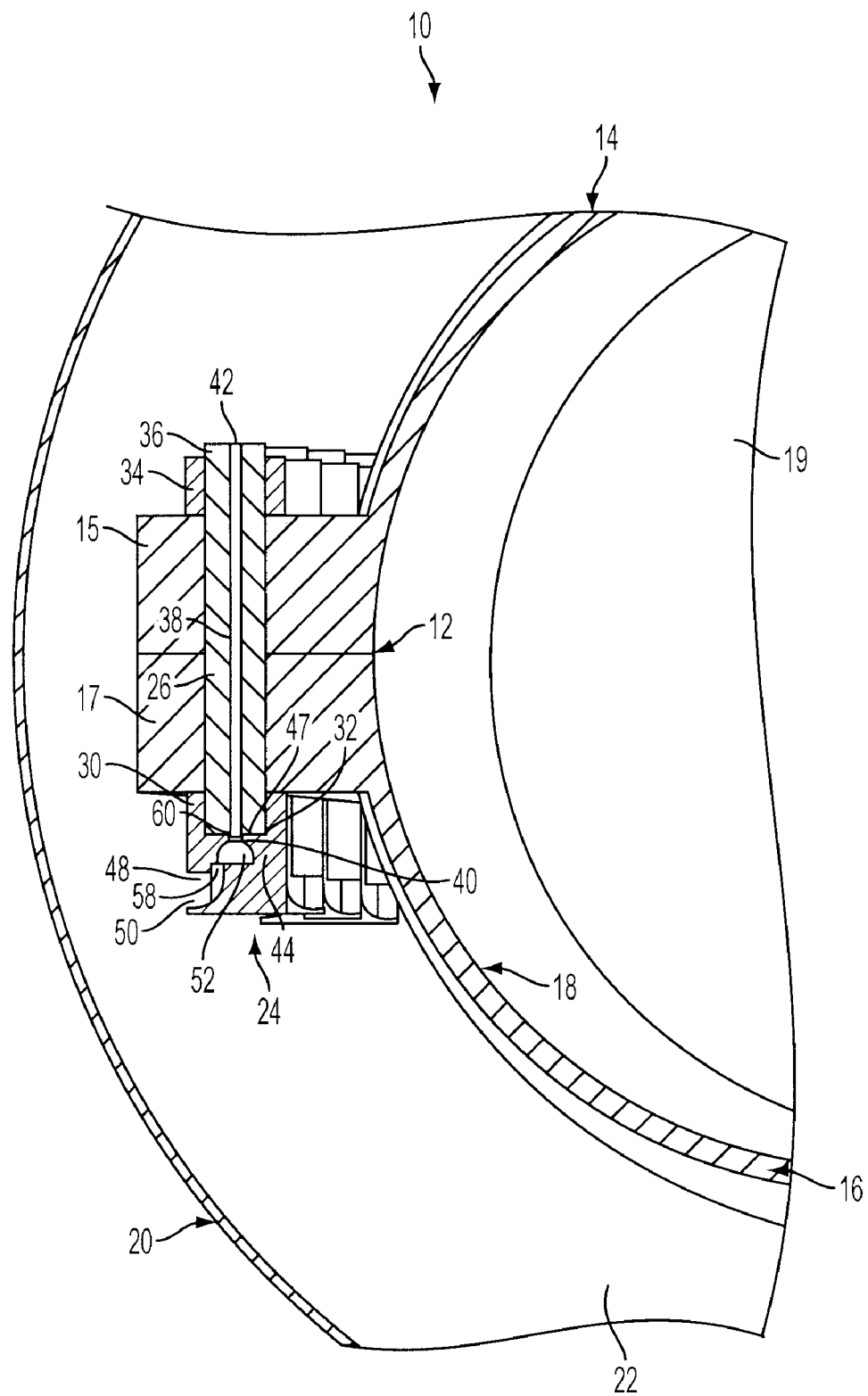
FIG. 1 is a partial section view of a turbine flange joint showing an outer casing, an inner casing and a fluid cooled fastener assembly in accordance with an aspect of the present invention.

Referring now to FIG. 1, a turbine engine 10 including a flange joint 12 in accordance with an aspect of the present invention is illustrated in partial section view. An inner upper casing 14 including an inner casing upper flange 15 and an inner lower casing 16 including an inner casing lower flange 17 are joined at the flange joint 12 into an inner casing 18 defining a turbine cavity 19. An outer casing 20 surrounds the inner casing 18 and defines a steam passage 22 between the inner casing 18 and the outer casing 20. During operation of the turbine engine 10, hot steam flows in the turbine cavity 19 causing the temperature of the inner casing 18 including the flange joint 12 to rise. As the hot steam passes through the turbine engine 10 it is cooled and subsequently discharged into the steam passage 22 where it is captured and ultimately routed outside of the turbine engine 10 by structure not shown. A portion of the cooled steam flows past the flange joint 12 as it travels in the steam passage 22 before it exits the turbine engine 10. It is an object of the present invention to capture a portion of the cooled steam flowing past the flange joint 12 and use the cooled steam as a cooling fluid to cool the fluid cooled fastener assemblies 24.

The flange joint 12 includes a plurality of fluid cooled fastener assemblies 24 provided to couple the inner casing upper flange 15 to the inner casing lower flange 17. As illustrated in FIG. 1, each of the fastener assemblies 24 comprises a fastener or threaded stud 26 and a first threaded nut 30 coupled to a collector end 32 of the threaded stud 26. A second threaded nut 34 is coupled to a discharge end 36 of the threaded stud 26. Alternatively, the fastener assembly 24 may comprise a threaded bolt in place of the threaded stud 26 and either the first threaded nut 30 or the second threaded nut 36. For purposes of discussion herein, a single fluid cooled fastener assembly 24 will be described, it being understood that the other fluid cooled fastener assemblies forming the flange joint 12 are similarly constructed.

A coolant passage 38 extends axially through the threaded stud 26 from the collector end 32 to the discharge end 36 defining an inlet opening 40 in the collector end 32 and a discharge opening 42 in the discharge end 36. The coolant passage 38 may comprise a heating bore provided for heating the threaded stud 26, such as during a tightening procedure in which the threaded stud 26 is heated, torqued and then cooled during installation of the threaded stud 26 on the flange joint 12. As will be discussed more thoroughly herein, the first threaded nut 30 comprises a coolant collector 44 integral with the threaded nut 30 and configured to capture a portion of the cooled steam flowing in the steam passage 22 past the coolant collector 44 and to direct it into the inlet opening 40 of the coolant passage 38. As the cooled steam flows through the coolant collector 44 and subsequently through the coolant passage 38 in the threaded stud 26, heat is transferred from the coolant collector 44 and the threaded stud 26 to the cooled steam thereby cooling the coolant collector 44 and the threaded stud 26. After passing through the coolant passage 38 in the threaded stud 26, the steam is discharged back into the steam passage 22 from the discharge opening 42 provided in the discharge end 36 of the threaded stud 26. The threaded stud 26 and first and second threaded nuts 30 and 34 may be made of any suitable material such as, for example, an alloy steel. In particular, the threaded stud 26 and first and second nuts 30 and 34 may be formed of martensitic stainless steel or a nickel based Inconel steel.

Figure 2:
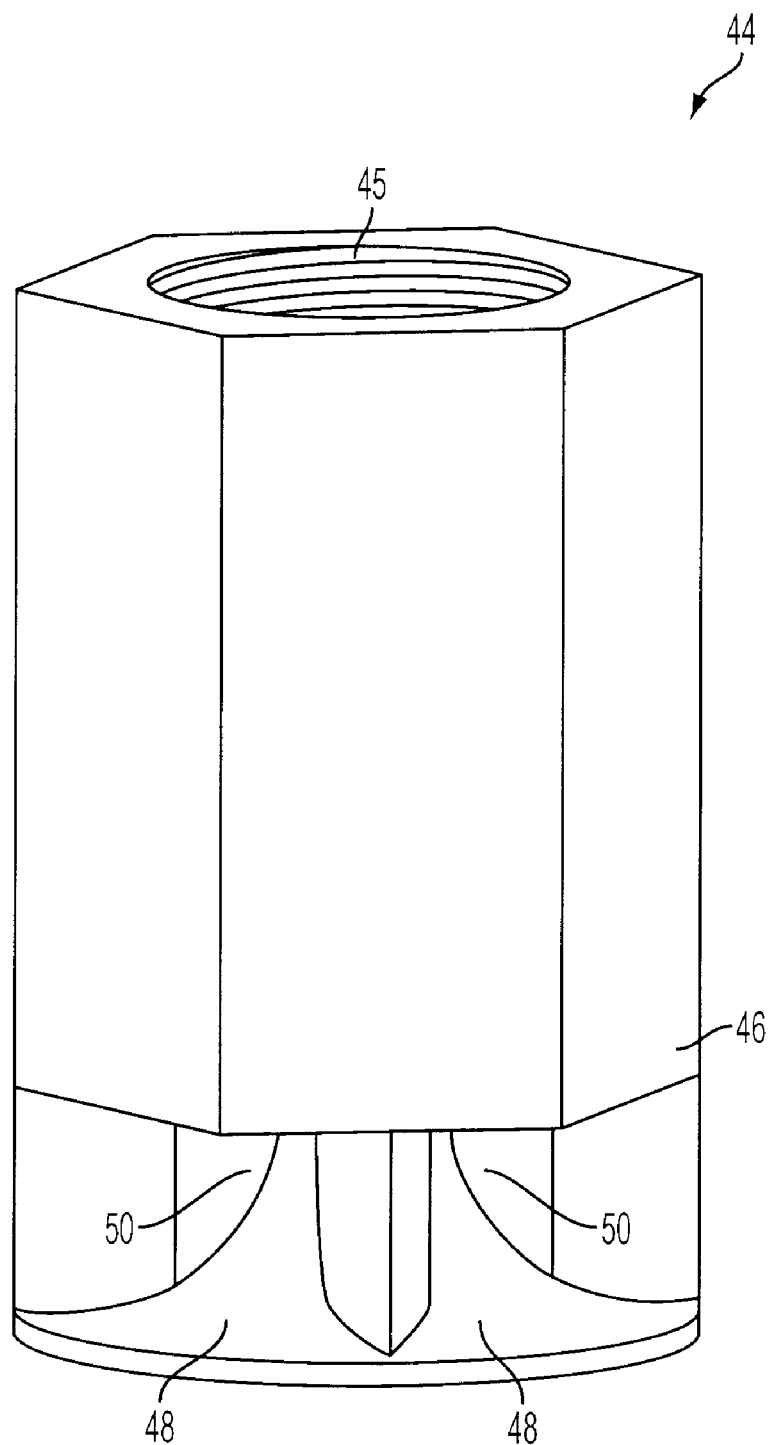
FIG. 2 is a perspective view of a coolant collector showing collector inlets and a portion of contoured passages leading from the collector inlets.

Referring now to FIG. 2, an exterior view of the coolant collector 44 is illustrated in perspective view. The coolant collector 44 comprises a hexagonal shaped nut, i.e., first threaded nut 30, that is internally threaded in a bore 45 so as to be suitable for threading onto the threaded stud 26. The bore 45 extends only partially through the coolant collector 44 and defines a substantially circular-shaped termination surface 47 (see FIG. 3) internal to the coolant collector 44 at the internal end of the bore 45.

An exterior surface 46 of the coolant collector 44 includes at least one opening therein defining at least one collector inlet 48. The collector inlet 48 is configured to capture a portion of the cooled steam flowing past the coolant collector 44 and to direct it into a contoured passage 50 leading internally from the collector inlet 48 into the coolant collector 44. The coolant collector 44 preferably includes a plurality of collector inlets 48 and most preferably includes four collector inlets 48 (only two shown in FIG. 2), spaced substantially equally around a periphery of the coolant collector 44. Each of the collector inlets 48 is configured to capture a portion of the cooled steam flowing past the coolant collector 44 from a different direction. In this fashion, it is not necessary to orient the coolant collector 44 in a particular rotational position on the threaded stud 26 during a tightening procedure.

Each of the collector inlets 48 is in communication with a corresponding contoured passage 50. The contoured passages 50 taper inwardly from the respective collector inlets 48 and are configured to accelerate the steam as it flows through the contoured passages 50. As the steam accelerates in the contoured passages 50, a heat transfer rate between the coolant collector 44 and the steam is increased.

As will be discussed more thoroughly herein, the contoured passages 50 may open into a nozzle chamber 52 disposed between the contoured passages 50 and the termination surface 47 defining a connection with the coolant passage 38 (see FIG. 1) in the threaded stud 26. Although the coolant collector 44 of the present embodiment is described as having four collector inlets 48 and four corresponding contoured passages 501 it is to be understood that a coolant collector 44 having more or fewer collector inlets 48 and corresponding contoured passages 50 may be provided in other embodiments without diverging from the spirit and scope of the present invention.

Figure 3:
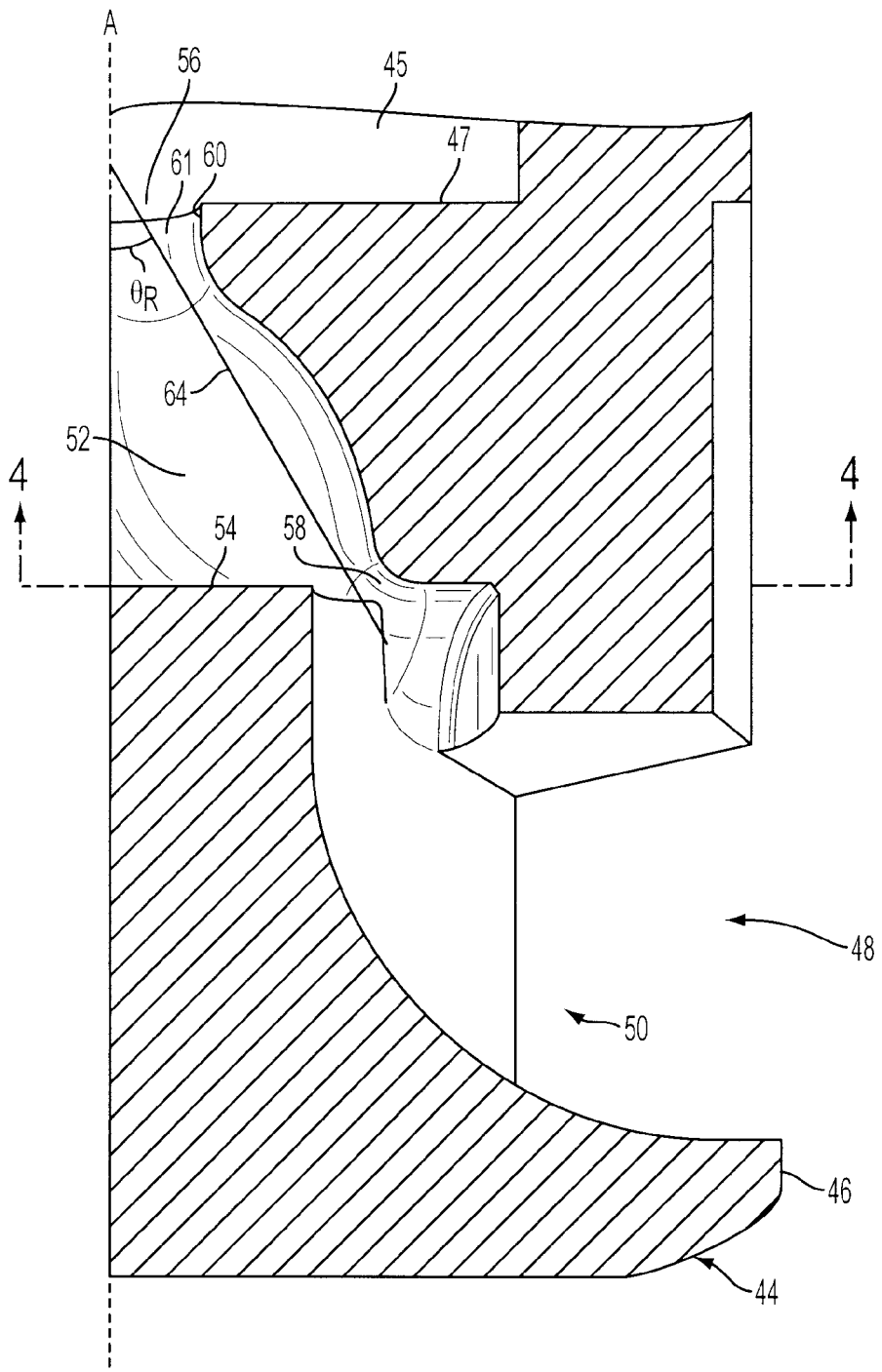
FIG. 3 is a partial section view of the coolant collector of FIG. 2 showing a contoured passage connected to a nozzle chamber through an angled entry port.

Referring now to FIG. 3, a partial internal view of the coolant collector 44 is illustrated in sectional view. As illustrated in FIG. 3, the nozzle chamber 52 (only partially shown in FIG. 3) is shaped in the form of an inverted funnel (see FIG. 1) centered on a chamber axis A and tapers from an entry end 54 to an exit end 56. The entry end 54 defines a surface that is substantially circular in shape. Each of the contoured passages 50 connects to the nozzle chamber 52 at the entry end 54 through an angled entry port 58. The angled entry ports 58 for each of the contoured passages 50 are spaced substantially equally about a circumference of the circular surface of the entry end 54.

The nozzle chamber 52 tapers inwardly toward the chamber axis A toward the exit end 56 and terminates in a nozzle 60 that is substantially centered on the chamber axis A. The nozzle 60 defines a nozzle exit passage 61 that opens into the bore 45 in the coolant collector 44 and is substantially centered in the circular-shaped termination surface 47 of the bore 45. When the coolant collector 44 is threaded onto the threaded stud 26, the nozzle 60 is positioned proximate to the inlet opening 40 of the coolant passage 38 in the threaded stud 26 and is aligned therewith (see FIG. 1). In this fashion, steam flowing through the nozzle chamber 52 is directed into the inlet opening 40 of the coolant passage 38 in the threaded stud 26 by the nozzle 60.

The angled entry ports 58 are configured to induce a swirling motion of the steam about the chamber axis A as the steam travels from the entry end 54 of the nozzle chamber 52 toward the nozzle 60. Thus, the steam rotates around the chamber axis A in a cyclonic fashion as it travels from the angled entry ports 58 toward the nozzle 60 and accelerates as it approaches the nozzle 60. As the steam accelerates and swirls within the nozzle chamber 52 the heat transfer rate between the coolant collector 44 and the steam is further increased.

Figure 4:
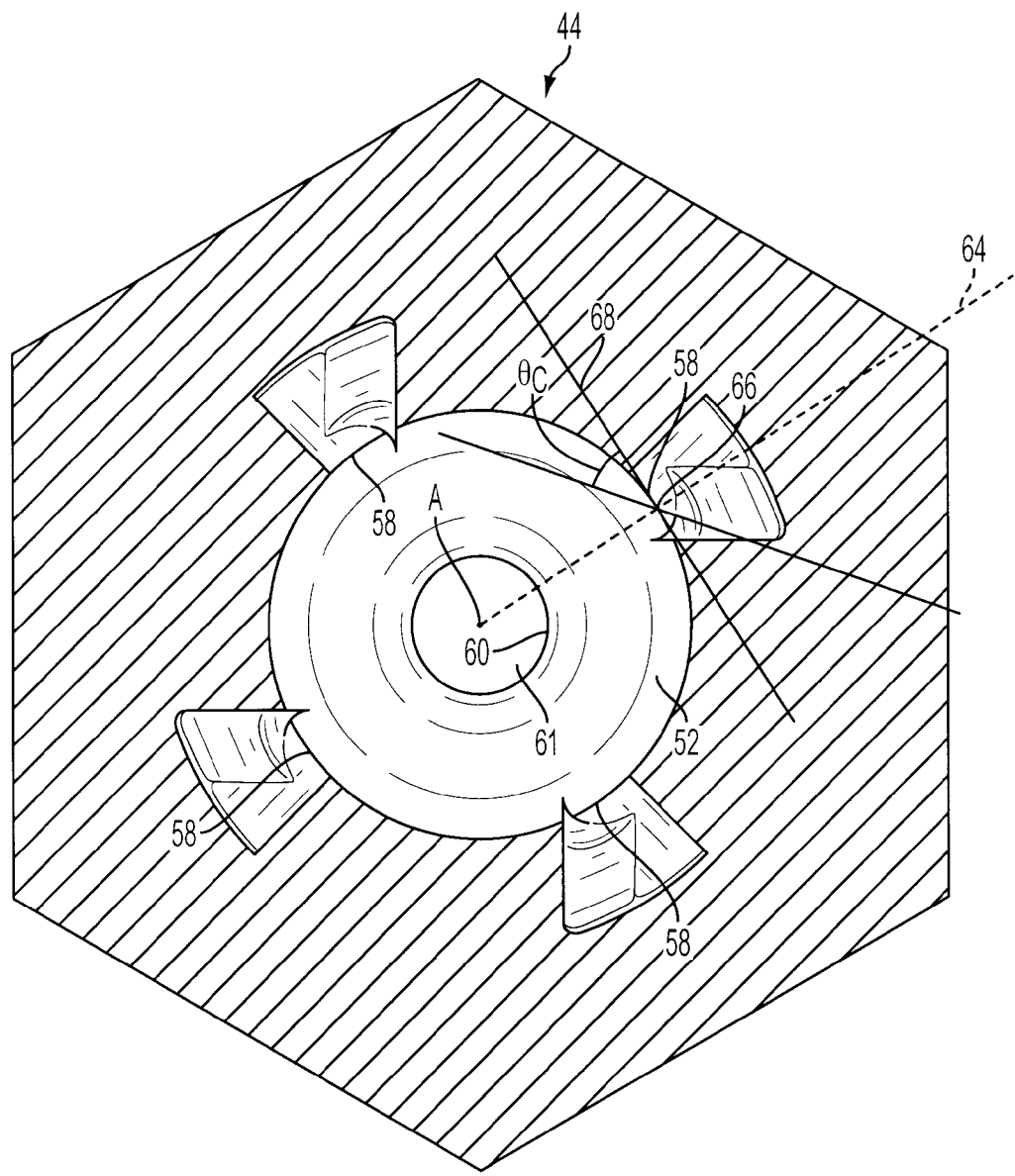
FIG. 4 is a section view of the coolant collector of FIG. 2 taken along section line 4-4 of FIG. 3 illustrating a bottom view of the nozzle chamber and four angled entry ports leading into the nozzle chamber.

FIG. 4 illustrates an internal view of the coolant collector 44 including the nozzle chamber 52 and the four angled entry ports 58 in sectional view taken along a section line 4-4 shown in FIG. 3. Each of the angled entry ports 58 defines a complex angle with the circular surface of the entry end 54 of the nozzle chamber 62 so as to direct the steam into the nozzle chamber 52 toward the chamber axis A and also circumferentially around the inside of the nozzle chamber 52 in order to induce the rotating cyclonic motion in the steam as previously described. For example, as illustrated on one of the angled entry ports 58, the angled entry port 58 may define a radial angular component $\Theta_R$ relative to the chamber axis A (see FIG. 3) to direct the steam radially inwardly toward the chamber axis A in a downstream direction. The angled entry port 58 may further define a circumferential angular component $\Theta_C$ to direct the steam circumferentially around the inside of the nozzle chamber 52. The value of the radial angular component OR may be within a range of about 15 degrees to about 45 degrees relative to a line 64 passing through a point 66 located substantially at a midpoint of the angled entry point 58 and intersecting with the chamber axis A. The value of the circumferential angular component $\Theta_C$ may be within a range of about 15 degrees to about 30 degrees relative to a line 68 drawn tangentially to a circle concentric with the chamber axis A coinciding with the outer diameter of the entry end 54 and passing through the point 66 located substantially at the midpoint of the angled entry port 58. The angled entry ports 58 preferably all define similar radial and circumferential angular components.

As the steam approaches the nozzle 60, its rotational velocity about the chamber axis A accelerates as it is confined by the tapered nozzle chamber 52. Upon passing through the nozzle exit passage 61 of the nozzle 60 the accelerated swirling steam is directed into the inlet opening 40 in the coolant passage 38 in the threaded stud 26. The steam passes through the coolant passage 38 in the threaded stud 26 from the collector end 32 to the discharge end 36 where it is ultimately discharged back into the steam passage 22 through the discharge opening 42 (see FIG. 1). The swirling cyclonic motion of the steam in the coolant passage 38 increases a heat transfer rate between the threaded stud 26 and the steam. In this fashion, heat is transferred from the threaded stud 26 to the steam and carried away from the threaded stud 26 as the steam is discharged into the steam passage 22 and ultimately routed outside of the turbine engine 10.

Although the fluid cooled fastener assembly 12 discussed herein comprises a coolant collector 44 integral with a threaded nut for threading onto a threaded stud or bolt, it is anticipated that a coolant collector 44 integral with a head of a bolt may be provided in other embodiments of the present invention. It is also anticipated that other embodiments of the present invention may be used in applications having a cooling fluid other than steam.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fluid cooled fastener assembly for use in a high temperature environment comprising:
   a fastener having a coolant passage extending axially through said fastener from a collector end to a discharge end;
   a coolant collector coupled to said collector end of said fastener, said coolant collector comprising:
   an exterior surface having a collector inlet therein, said collector inlet configured to capture a portion of a cooling fluid flowing past said coolant collector; and
   a contoured passage in communication with said collector inlet, said contoured passage configured to accelerate said cooling fluid flowing into said collector inlet such that a heat transfer rate between said cooling fluid and at least one of said coolant collector and said fastener is increased, said contoured passage further configured to direct said cooling fluid into said coolant passage in said fastener;
   wherein said cooling fluid flows through said coolant passage in said fastener from said collector end to said discharge end and removes heat from at least one of said coolant collector and said fastener.

2. The fastener assembly of claim 1, wherein said coolant collector further comprises:
   a nozzle chamber disposed between said contoured passage and said coolant passage in said fastener, said nozzle chamber configured to receive said cooling fluid from said contoured passage and to accelerate said cooling fluid flowing through said nozzle chamber such that a heat transfer rate between said cooling fluid and at least one of said coolant collector and said fastener is further increased; and a nozzle disposed at an exit end of said nozzle chamber, said nozzle configured to confine said cooling fluid flowing in said nozzle chamber and to direct said cooling fluid into said coolant passage in said fastener.

3. The fastener assembly of claim 2, wherein said contoured passage couples to said nozzle chamber through an angled entry port at an entry end of said nozzle chamber, said angled entry port configured to induce a swirling motion in said cooling fluid in said nozzle chamber, wherein said swirling motion of said cooling fluid further increases said heat transfer rate between said cooling fluid and at least one of said coolant collector and said fastener.

4. The fastener assembly of claim 3, wherein:
said coolant collector further comprises a plurality of collector inlets arranged about a periphery of said coolant collector, each of said plurality of collector inlets configured to capture a portion of said cooling fluid flowing past said coolant collector from a different direction; and
said contoured passage comprises a plurality of contoured passages, each of said plurality of contoured passages coupling one of said plurality of collector inlets to said nozzle chamber through one of a plurality of angled entry ports at said entry end of said nozzle chamber.

5. The fastener assembly of claim 4, wherein:
said plurality of collector inlets comprises four collector inlets, each of said four collector inlets spaced substantially equally about said periphery of said coolant collector; and
said plurality of contoured passages comprises four contoured passages.

6. The fastener assembly of claim 3, wherein said angled entry port defines a complex angle with a substantially circular entry surface of said nozzle chamber, said complex angle comprising:
a circumferential angular component configured to direct said cooling fluid circumferentially around an interior surface of said nozzle chamber; and
a radial angular component configured to direct said cooling fluid inward toward a chamber axis of said nozzle chamber, said chamber axis extending from said entry end to said exit end of said nozzle chamber.

7. The fastener assembly of claim 6, wherein:
said circumferential angular component is within a range of about 15 degrees to about 30 degrees to a line drawn tangentially to said circular entry surface located substantially at a midpoint of said angled entry port; and
said radial angular component is within a range of about 15 degrees to about 45 degrees relative to said chamber axis of said nozzle chamber.

8. The fastener assembly of claim 1, wherein:
said fastener comprises a threaded fastener; and
said coolant collector further comprises a threaded nut, said threaded nut being threaded onto said collector end of said fastener.

9. The fastener assembly of claim 1, wherein:
said fastener comprises a bolt; and
said coolant collector further comprises a head of said bolt.

10. A turbine joint assembly including an inner casing and an outer casing defining a steam passage therebetween, said turbine joint assembly comprising:
an inner casing upper flange;
an inner casing lower flange; and
a fluid cooled fastener assembly for joining said inner casing upper flange to said inner casing lower flange, said fluid cooled fastener assembly comprising:
a fastener having a coolant passage extending axially through said fastener from a collector end to a discharge end;
a coolant collector coupled to said collector end of said fastener, said coolant collector comprising:
an exterior surface having a collector inlet therein, said collector inlet configured to capture a portion of a cooling fluid flowing past said coolant collector; and
a contoured passage in communication with said collector inlet, said contoured passage configured to accelerate said cooling fluid flowing into said collector inlet such that a heat transfer rate between said cooling fluid and at least one of said coolant collector and said fastener is increased, said contoured passage further configured to direct said cooling fluid into said coolant passage in said fastener;
wherein said cooling fluid flows through said coolant passage in said fastener from said collector end to said discharge end and removes heat from at least one of said coolant collector and said fastener.

11. The turbine joint of claim 10, wherein said coolant collector further comprises:
a nozzle chamber disposed between said contoured passage and said coolant passage in said fastener, said nozzle chamber configured to receive said cooling fluid from said contoured passage and to accelerate said cooling fluid flowing through said nozzle chamber such that said heat transfer rate between said cooling fluid and at least one of said coolant collector and said fastener is further increased; and
a nozzle disposed at an exit end of said nozzle chamber, said nozzle configured to confine said cooling fluid flowing in said nozzle chamber and to direct said cooling fluid into said coolant passage in said fastener.

12. The turbine joint assembly of claim 11, wherein said contoured passage couples to said nozzle chamber through an angled entry port at an entry end of said nozzle chamber, said angled entry port configured to induce a swirling motion in said cooling fluid flowing in said nozzle chamber, wherein said swirling motion further increases said heat transfer rate between said cooling fluid and at least one of said coolant collector and said fastener.

13. The turbine joint of claim 12, wherein:
said coolant collector further comprises a plurality of collector inlets arranged about a periphery of said coolant collector, each of said plurality of collector inlets configured to capture a portion of said cooling fluid flowing past said coolant collector from a different direction; and
said contoured passage comprises a plurality of contoured passages, each of said plurality of contoured passages coupling one of said plurality of collector inlets to said nozzle chamber through one of a plurality of angled entry ports at an entry end of said nozzle chamber.

14. The turbine joint of claim 12, wherein said angled entry port defines a complex angle with an entry surface of said nozzle chamber, said complex angle comprising:
a circumferential angular component configured to direct said cooling fluid circumferentially around an interior surface of said nozzle chamber; and
a radial angular component configured to direct said cooling fluid inward toward a chamber axis of said nozzle chamber, said chamber axis extending from said entry end to said exit end of said nozzle chamber.

15. The turbine joint of claim 14, wherein:
said circumferential angular component is within a range of about 15 degrees to about 30 degrees to a line drawn tangentially to said circular entry surface located substantially at a midpoint of said angled entry port; and
said radial angular component is within a range of about 15 degrees to about 45 degrees relative to said chamber axis of said nozzle chamber.

16. A method of cooling a fastener assembly for use in a high temperature environment, comprising:
providing a fastener having a coolant passage extending axially through said fastener from a collector end to a discharge end;
providing a coolant collector coupled to said collector end of said fastener, comprising:
providing a collector inlet in an exterior surface of said coolant collector for collecting a cooling fluid from a cooling fluid flow; and
providing a contoured passage in communication with said collector inlet for receiving said cooling fluid from said collector inlet;
capturing a portion of a cooling fluid flowing past said coolant collector in said collector inlet;
accelerating said cooling fluid in said contoured passage such that a heat transfer rate between said cooling fluid and at least one of said coolant collector and said fastener is increased;
directing said cooling fluid into said coolant passage in said fastener;
passing said cooling fluid through said coolant passage from said collector end to said discharge end;
transferring heat from at least one of said coolant collector and said fastener to said cooling fluid; and
discharging said cooling fluid from said discharge end of said coolant passage.

17. The method of claim 16, wherein said providing a coolant collector further comprises:
providing a nozzle chamber disposed between said contoured passage and said coolant passage in said fastener, said nozzle chamber including a nozzle at an exit end of said nozzle chamber;
accelerating said cooling fluid flowing through said nozzle chamber such that a heat transfer rate between said cooling fluid and at least one of said coolant collector and said fastener is further increased; and
directing said cooling fluid through said nozzle and into said coolant passage in said fastener.

18. The method of claim 17, wherein said providing a coolant collector further comprises inducing a swirling motion in said cooling fluid in said nozzle chamber, wherein said swirling motion of said cooling fluid further increases a heat transfer rate between said cooling fluid and at least one of said coolant collector and said fastener.

19. The method of claim 16, wherein:
said providing a collector inlet comprises providing a plurality of collector inlets arranged about a periphery of said coolant collector, each of said plurality of collector inlets configured to capture a portion of said cooling fluid flowing past said coolant collector from a different direction; and
said providing a contoured passage comprises providing a plurality of contoured passages, each of said plurality of contoured passages in communication with one of said plurality of collector inlets.

20. The method of claim 16, wherein said capturing a portion of a cooling fluid flowing about said coolant collector comprises capturing a portion of a cooling steam flowing between an inner casing and an outer casing of a steam turbine.

* * * * *